(12) United States Patent
Simmons

(10) Patent No.: US 11,878,581 B1
(45) Date of Patent: Jan. 23, 2024

(54) WHEEL FOR MOTOR VEHICLE WITH INDEPENDENTLY ROTATING TIRE AND PLANETARY GEAR SYSTEM

(71) Applicant: Nathan Joseph Simmons, Ashburn, VA (US)

(72) Inventor: Nathan Joseph Simmons, Ashburn, VA (US)

(*) Notice: Subject to any disclaimer, the term of this patent is extended or adjusted under 35 U.S.C. 154(b) by 0 days.

(21) Appl. No.: 18/342,174

(22) Filed: Jun. 27, 2023

(51) Int. Cl.
*B60K 17/04* (2006.01)
*B60K 7/00* (2006.01)
*B60L 15/20* (2006.01)

(52) U.S. Cl.
CPC .......... *B60K 17/046* (2013.01); *B60K 7/0007* (2013.01); *B60K 2007/0038* (2013.01); *B60K 2007/0069* (2013.01); *B60L 15/2054* (2013.01); *B60L 2220/44* (2013.01)

(58) Field of Classification Search
CPC .... B60K 17/046; B60K 17/02; B60K 17/043; B60K 7/00–8/00; B60K 2007/0069; B60K 2007/0038; B62M 7/12; B60L 2220/44; B60L 2220/15; B60L 2220/2054; F16H 1/003–1/48
See application file for complete search history.

(56) References Cited

U.S. PATENT DOCUMENTS

| | | | |
|---|---|---|---|
| 1,155,123 A * | 9/1915 | Barton | F16H 1/203 74/420 |
| 5,560,442 A * | 10/1996 | Canderle | B62M 6/65 180/65.6 |
| 6,139,464 A | 10/2000 | Roske | |
| 6,672,985 B2 | 1/2004 | Chung et al. | |
| 6,752,227 B1 * | 6/2004 | Bachmann | B60K 17/046 74/390 |
| 6,974,399 B2 * | 12/2005 | Lo | B60L 15/2054 475/5 |
| 7,357,743 B2 * | 4/2008 | Mao | H02K 1/146 475/5 |
| 7,621,835 B2 * | 11/2009 | Oshidari | B60K 7/0007 475/5 |
| 8,316,973 B2 * | 11/2012 | Walter | B60K 7/0007 180/65.51 |
| 9,855,992 B1 * | 1/2018 | Liang | B60K 17/046 |
| 10,766,361 B2 | 9/2020 | Forrest et al. | |
| 2018/0001958 A1 | 1/2018 | Liang | |
| 2020/0263765 A1 | 8/2020 | Kukkola et al. | |
| 2022/0097451 A1 * | 3/2022 | Atzeni | B60B 27/0015 |

FOREIGN PATENT DOCUMENTS

| | | | |
|---|---|---|---|
| KR | 20050115417 A | * | 12/2005 |
| TW | 201808718 A | | 3/2018 |
| WO | WO-2016179761 A1 | * | 11/2016 |
| WO | WO-2022108214 A1 | * | 5/2022 |
| WO | WO-2023008762 A1 | * | 2/2023 |

* cited by examiner

*Primary Examiner* — Tinh Dang

(57) ABSTRACT

The present invention relates to a wheel for motor vehicles that incorporates a planetary gear system within the wheel assembly. The wheel aims to increase the mechanical advantage of the wheel by providing additional rotation to the wheel axis of the vehicle, thus reducing the amount of fuel exhausted by the vehicle during transit. By utilizing an internal and planetary gear system with integrated motors housed within the wheel, the tire of the wheel is able to rotate independently from the axel of the vehicle in the same direction, thus providing an increased power output.

17 Claims, 4 Drawing Sheets

WHEEL FOR MOTOR VEHICLE WITH INDEPENDENTLY ROTATING TIRE AND PLANETARY GEAR SYSTEM

FIELD OF THE INVENTION

The present invention relates generally to a wheel assembly for a motor vehicle. More specifically, the present invention is a wheel for a motor vehicle with an independently rotating tire and planetary gear system for providing increased mechanical advantage to a moving vehicle.

BACKGROUND OF THE INVENTION

The present invention relates to an innovative car tire design that incorporates independent movement similar to tank treads while maintaining the traditional spinning motion of the wheel on the axle. Traditional automobile wheel designs consist of a circular rim that is attached to the axle of the vehicle. These wheels are primarily designed to provide rotational motion, enabling the car to move forward or backward. The tires mounted on these wheels are typically constructed with a patterned surface, known as the tread, to improve grip and traction on various road surfaces. While these conventional designs have served the automotive industry well, they do not provide any mechanical advantage to the motion of the vehicle.

Contrarily, tank treads have been employed for several decades in military vehicles and heavy machinery due to their exceptional traction and maneuverability. Tank treads consist of a series of interconnected, articulated metal plates known as track links. These track links are designed to wrap around a set of wheels or rollers, allowing the tank to move over uneven terrain while maintaining maximum traction. The independent movement of each track link enables the tank to overcome obstacles and negotiate tight turns with ease. Tank treads have proven highly effective in providing stability, traction, and enhanced maneuverability in challenging conditions.

Various attempts have been made in the prior art to develop tire designs that provide improved traction and power output. Some innovations focus on altering the tread pattern, incorporating grooves, sipes, or different rubber compounds to enhance grip on wet or icy surfaces. However, these approaches primarily address the interaction between the tire and the road, rather than the independent movement of the tire itself.

Other prior art includes the development of individual tire units that can move independently of one another, allowing the vehicle to adapt to changing terrains. These designs typically utilize complex mechanisms or hydraulics to control the movement of each tire, enabling enhanced maneuverability and traction. However, such systems often require substantial modifications to the existing wheel and axle structures, making them impractical for retrofitting on standard automobile platforms.

The primary objective of the present invention is to increase the mechanical advantage of a motor vehicle's wheel through the implementation of a planetary gear system. By incorporating this system directly into the wheel assembly, the invention enables independent rotation of the wheel while the vehicle is in motion. This independent rotation enhances the vehicle's output, similarly to the act of walking up the stairs of an escalator, the proposed wheel design offers an additional means for power output, separate from the engine of the motor. Much like the threads of a tank, the outermost layer of the wheel assembly of the present invention rotates to add additional torque to the system.

Furthermore, the present invention seeks to enhance the energy efficiency of motor vehicles by minimizing power losses associated with traditional wheel designs. The planetary gear system, coupled with efficient motors, allows the wheel to rotate with reduced fuel consumption. This optimization leads to enhanced fuel efficiency, extended battery life in electric vehicles, and reduced environmental impact.

SUMMARY OF THE INVENTION

The wheel's central component is a planetary gear system, consisting of a single internal gear and multiple smaller gears known as planet gears. The internal gear is fixed to an outer ring of the wheel assembly, while the planet gears engage with the teeth of internal gear. With the planet gears being attached to an axel rod, connected to a motor, the planet gears rotate, thus causing the rotation of the internal gear. The planetary gear system enhances the mechanical advantage of the wheel by distributing the load evenly among the planet gears, allowing for the rotation of the outermost portion of the wheel, coupled with the rotational movement of the tire, thus providing a higher power output for the amount of fuel consumed.

The present invention utilizes at least one motor, which drives the smaller planet gears, resulting in the rotation of the entire wheel assembly. By integrating motors into the wheel, the invention achieves independent wheel rotation. The motors can be powered by various sources, such as the vehicle's engine, electric powertrain, or dedicated batteries. In addition to the planetary gear system and motors, the present invention retains the conventional components found in a wheel assembly. These components include a tire, a rim, a brake assembly, and spokes. The tire provides the necessary contact with the road surface, offering grip and stability. The rim securely holds the tire in place while providing structural support to the wheel assembly.

When the vehicle is in motion, the rotational movement of the vehicle's axle is transmitted to the entirety of the wheel assembly as in a traditional motor vehicle, however an additional motor transmits torque to the internal gear of the wheel assembly. The rotation of the planet gears forces the movement of the internal gear and the outer ring of the wheel, which is the tire. This rotational motion results in the independent rotation of the tire, facilitated by the motors attached to the planet gears.

The independent wheel rotation provides several advantages. Firstly, it enhances the vehicle's output by providing an additional output torque to each of the wheels, thus allowing the vehicle to obtain additional power. Additionally, the planetary gear system's design distributes the load among multiple planet gears, reducing the strain on individual components and promoting durability.

Furthermore, the present invention's wheel design offers improved energy efficiency. By utilizing motors and planetary gears, the wheel assembly minimizes overall power transfer from the engine and motor of the motor vehicle. The reduced friction within the planetary gear system and the efficient operation of the motors contribute to enhanced energy efficiency, resulting in improved fuel economy for conventional vehicles and extended range for electric vehicles. The present invention's wheel design also promotes maneuverability. With the ability to rotate independently from the wheel axel, each wheel can adjust its rotational speed and direction, allowing for improved handling and control.

DETAIL DESCRIPTIONS OF THE INVENTION

Figure 1:
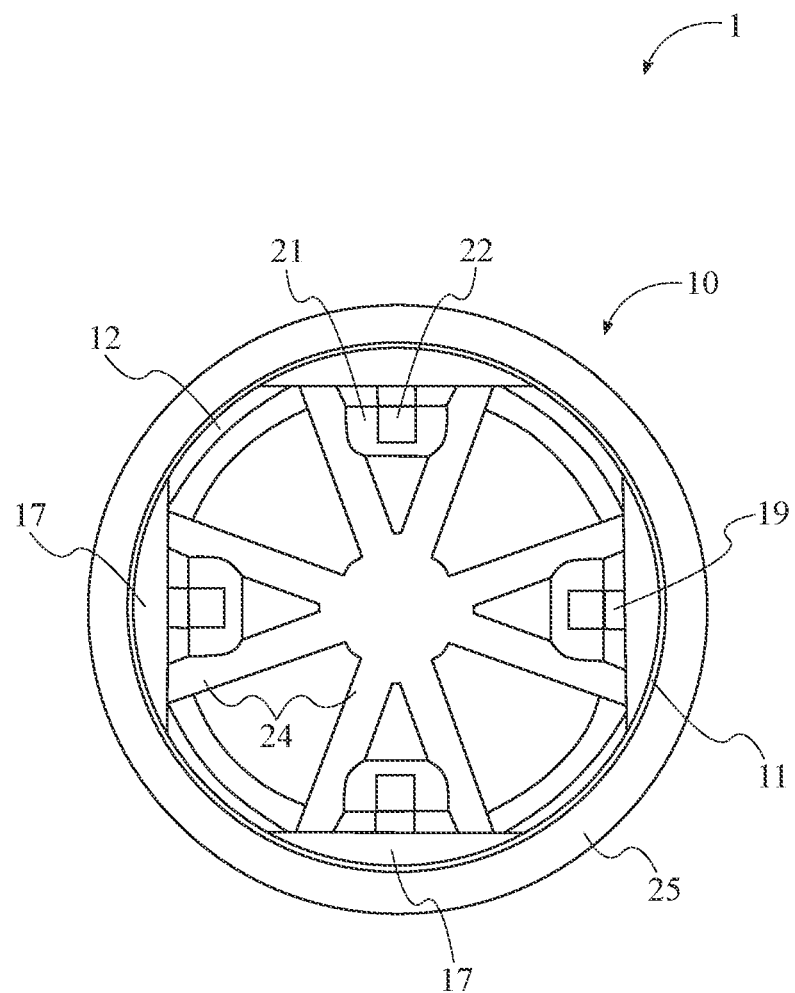
FIG. 1 is a front view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a wheel assembly comprising an internal gear with a planetary gear system, embodiments of the present disclosure are not limited to use only in this context.

The present invention is directed towards a wheel for a vehicle. It is known to those in the art that a wheel is a circular device that plays a fundamental role in the operation of various vehicles and machinery. It comprises several key components, each with specific functions contributing to its overall functionality and performance. Furthermore, it is known to those in the art that a wheel comprises a rim, spokes, a hub, an axle, and bearings. The rim is the outermost part of the wheel that forms a circular shape and serves as the base for the tire. It provides a mounting surface for the tire and distributes the vehicle's weight evenly. The rim's design and material can impact the wheel's strength, weight, and aesthetic appearance. Spokes are slender rods or bars that connect the rim to the central hub. They radiate outward from the hub and distribute the load evenly across the wheel. Spokes play a crucial role in maintaining the structural integrity and strength of the wheel while allowing flexibility to absorb shocks and vibrations. The hub is the central component of the wheel that attaches to the axle. It provides a stable connection point for the wheel and allows it to rotate smoothly. The hub may contain bearings or bushings that enable the wheel to spin freely, reducing friction and facilitating efficient movement. The axle is a shaft that connects and supports the wheels on a vehicle. It provides stability and ensures the proper alignment of the wheels. The axle transfers the weight of the vehicle and the forces exerted on the wheels to the suspension system, allowing for safe and controlled movement. Wheel bearings are crucial components located within the hub assembly. They enable the smooth rotation of the wheel by reducing friction between the rotating hub and the stationary axle. Wheel bearings are typically sealed to prevent contaminants from entering and damaging the bearings, ensuring optimal performance and longevity.

Within the context of the present invention, herein when referring to a gear having teeth, it should be noted that a gear in the context of the present invention, is a disk-shaped manufacture comprising teeth. The use of teeth, as referred to herein, as used in the context of the present invention, is denoted as an interference surface between two gears. Though the use of teeth in the plain-text context has been used to describe protruded features proximate the circumference of the gear, within the context of the present invention, the teeth of the present invention may also denote a surface having a frictional force wherein the rotational force of one gear may turn another by frictional interaction alone, thus normal forces traditionally associated with gears are not a requirement for the present invention.

Herein, FIGS. 1-4 as currently presented, are in reference to the present invention wherein said invention is a wheel assembly 1 comprising a wheel 10 wherein said wheel 10 comprises an internal gear 11 and an at least one planetary gear 15 for a motor vehicle. The present invention, although described herein as a wheel assembly 1 for a motor vehicle, it shall not be interpreted to be limiting to only vehicles, rather the present invention may be used in context of any apparatus that utilizes wheels to travel a distance over a surface. Furthermore, some components including those found within the prior art that are not intended to be improved upon within the present invention, and thus not components sought to be directly related to the present invention, are assumed to be present within the present invention, although not shown within the figures or referred to within the specification, as the inclusion of such components would be understood to one of ordinary skill to be inherent within a wheel assembly 1 for a vehicle.

Figure 2:
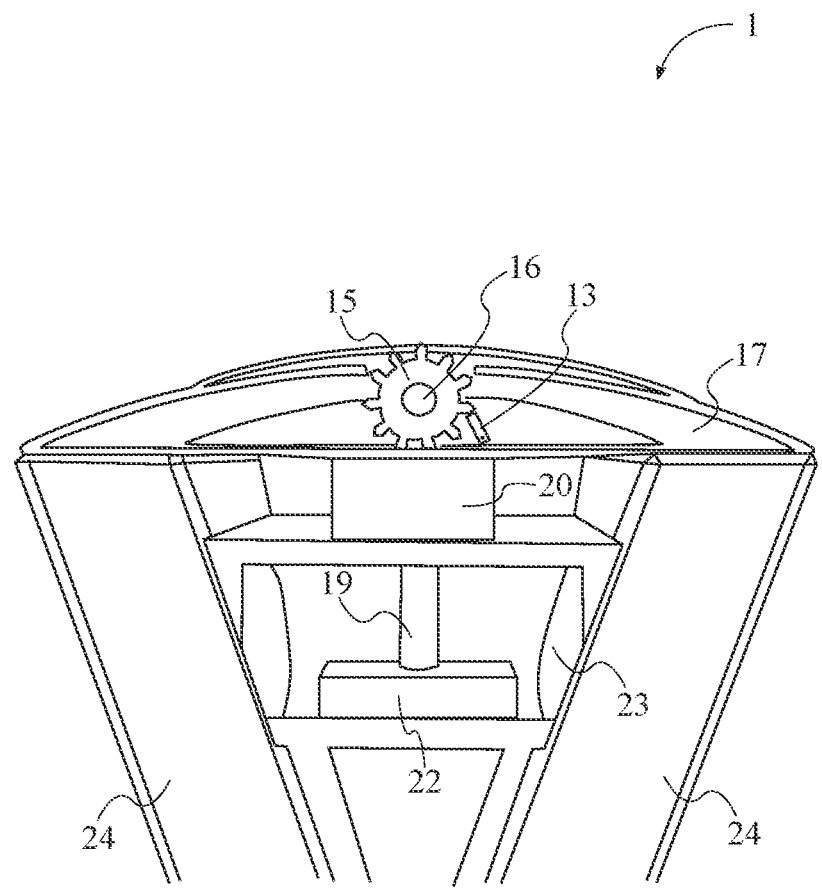
FIG. 2 is a sectional view of the present invention detailing the internal mechanics of the present invention.

As shown in FIG. 1 and FIG. 2, the wheel 10 of the present invention comprises the internal gear 11 and the at least one planet gear 15. The internal gear 11 comprises a plurality of teeth. Furthermore, the at least one planet gears 15 comprises a plurality of teeth. The teeth of the internal gear 11 engage with the teeth of the at least one planet gear 15. In the preferred embodiment of the present invention, the present invention comprises a plurality of planet gears 14 wherein said planet gears 15 are gears having a radius less than that of the internal gear 11 wherein the teeth of the internal gear 11 engage with the teeth of the planet gears 15. The internal gear 11 of the present invention is the outermost ring of the wheel 10 of the present invention. The outermost surface of the internal gear 11 engages with a tire 25. The tire 25 is circumferentially engaged to the outermost surface of the internal gear 11 wherein the tire 25 and the internal gear 11 are in a fixed position in relation to one another. The area of the internal gear 11 that engages the tire 25 is referred herein as a barrel 12.

The at least one planetary gear 15 of the present invention rotates around an axis whereby the axis is fixed by an rod referred to herein as a planetary gear rod 16. The planetary gear rod 16 comprises two ends, a first end and a second end whereby the first end is coupled to the planetary gear 15. The planetary gear rod 16, wherein there is one planetary gear rod 16 for every planetary gear 15, is concentrically positioned in relation to the planetary gear 15, thus allowing for rotation around a centered axis. In some embodiments of the present invention, the planetary gears 15 are held within a cavity referred to herein as a planetary gear housing 17. The planetary gear housing 17 is an enclosed cavity whereby the at least one planetary gear 15 is shielded from external factors.

Figure 3:
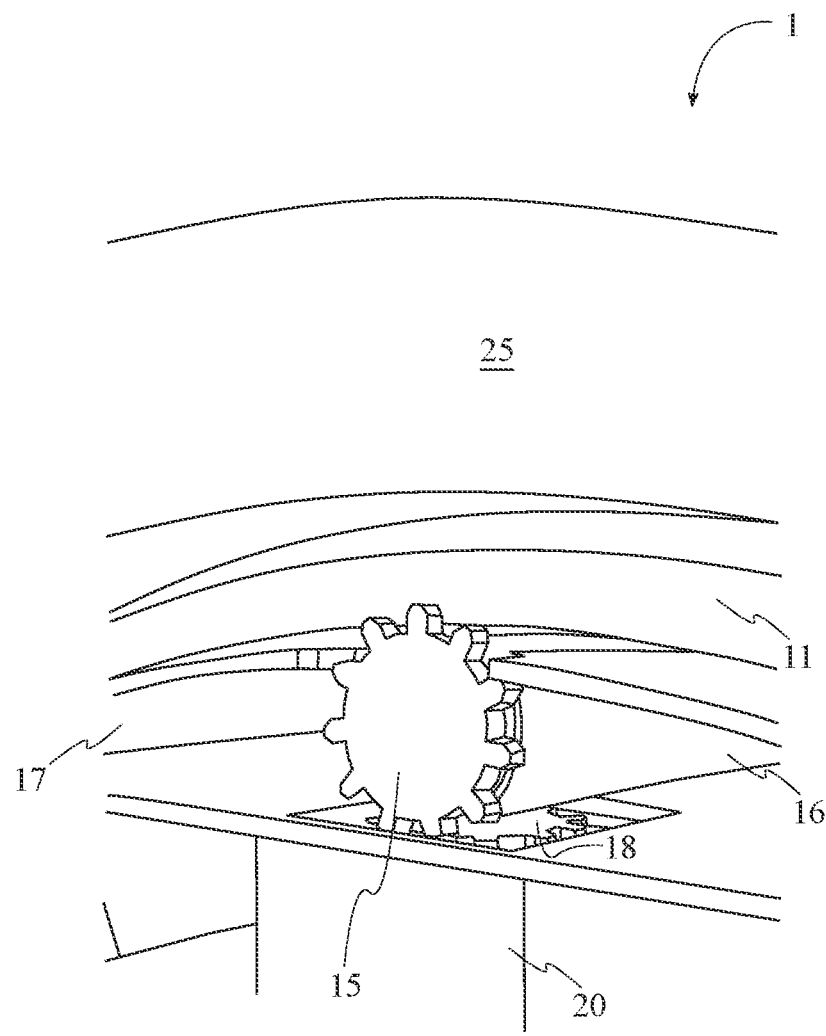
FIG. 3 is a detail view of the planetary gear system of the present invention.

In some embodiments, as further shown in FIG. 2 and FIG. 3, the present invention combines a gear system comprising the planetary gears 15 and a bevel gear 18 system, whereby the system comprises a gear that engages with the planetary gears 15. In the aforementioned embodiment of the present invention, the bevel gears 18 rotate and engage with the planetary gears 15 from an axis that is perpendicular to the axis in which the planetary gears 15 rotate. Furthermore, as in the aforementioned embodiment, the axis of rotation of the planetary gears 15 are parallel to the axis of rotation of the wheel 10 itself, wherein the axis of rotation of the bevel gears 18 are located on an imaginary plane perpendicular to an imaginary plane that comprises the axis of rotation of the planetary gears 15. The axis of rotation of the bevel gear 18 is materialized by a bevel gear rod 19, wherein the bevel gear 18 is coupled to the bevel gear rod 19. The bevel gear rod 19 comprises a first end and a second end whereby the bevel gear 18 is coupled proximate to the first end of the bevel gear rod 19. In some embodiments of the present invention, the bevel gear 18 is housed within a substantially concealed cavity referred to herein as a bevel gear housing 20.

Figure 4:
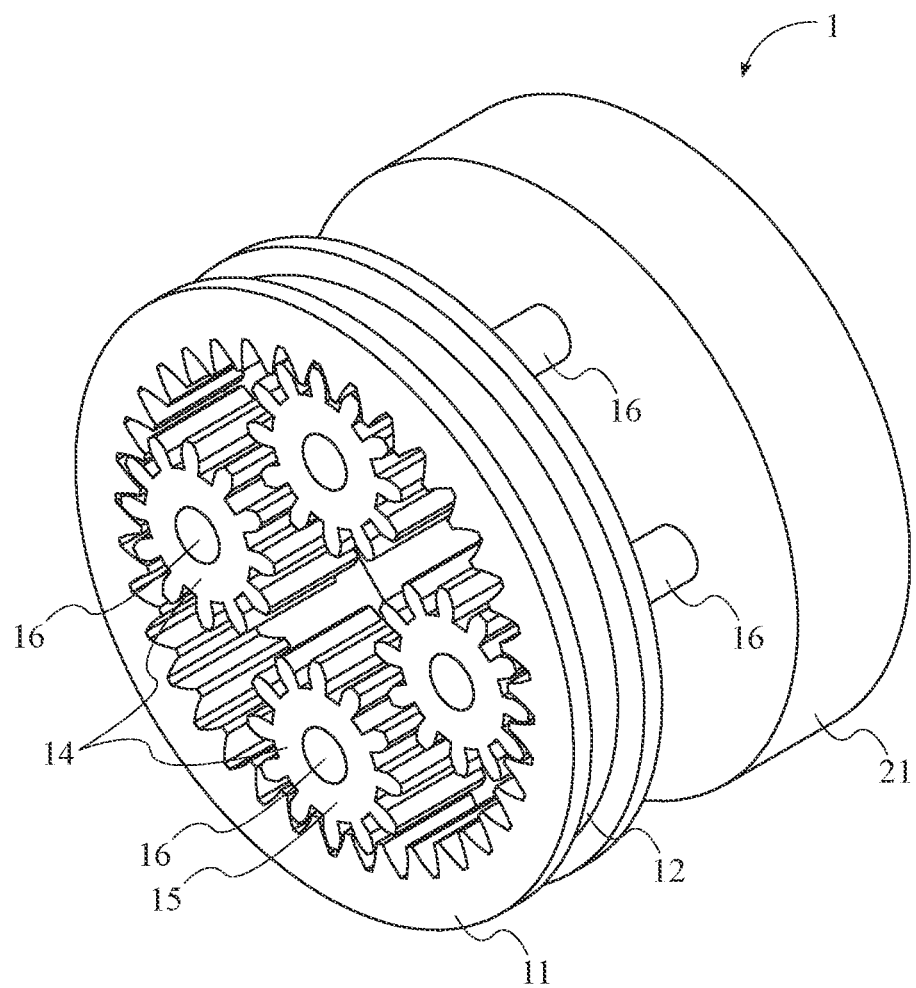
FIG. 4 is a perspective view of the present invention.

The present invention further comprises an at least one motor 22. In the preferred embodiment of the present invention, the motor 22 is coupled to the second end of the planetary gear rod 16s. In alternative embodiments of the present invention, the motor 22 is coupled to the second end of the bevel gear rod 19. Through the motor 22, torque is transferred from the at least one planetary gear 15 to the internal gear 11. The motor 22 is held within a motor housing 21. The motor housing 21 is a substantially concealed cavity 23 wherein the motor 22 is housed. In some embodiments of the present invention, a plurality of motors 22 is used, as one is used to apply torque to each planetary gear 15. In some embodiments of the present invention, the wheel 10 further comprises a plurality of spokes 24 wherein the motor housing 21, the planetary gear housing 17, and the bevel gear housing 20 are located in between two of the spokes 24. In some embodiments, as shown in FIG. 4, the present invention comprises a plurality of planetary gears 15 whereby the planetary gear rod 16s extend into the motor housing 21 wherein said motor housing 21 is positioned behind the internal gear 11 system. In the context of the present invention, "behind" as previously used is intended to mean a position, when in its use configuration, whereby said use configuration is coupled to the axel of a vehicle, the "hidden" or the non-outwardly showing side of the present invention.

Additionally, as shown in FIG. 2, the present invention further comprises a ratcheting system 13 whereby the ratcheting system 13 comprises a means for limiting the rotation of the gears to an omnidirectional manner. It need not be mentioned as it is understood by one in the art, although because the present invention pertains to a wheel 10, it is known that the wheel 10 rotates about an axel of a vehicle, though this component is not shown it is understood to be centrally located in a manner that allows for rotation as is normally the case in the art.

The present invention is a wheel assembly 1 whereby, as the present invention rotates around the axel of a vehicle, the motor 22 of the present invention, applied a torque that is translated to the internal gear 11 and thus the tire 25 of the present invention to apply an additional output contributing to the forward movement of the vehicle. The present invention is not to be misunderstood as a substitute for rotational movement of a tire 25, but rather a supplemental mechanism that assists in the movement of the vehicle.

Although the invention has been explained in relation to its preferred embodiment, it is to be understood that many other possible modifications and variations can be made without departing from the spirit and scope of the invention.

What is claimed is:

1. A wheel assembly for a vehicle comprising a wheel wherein said wheel comprises:
    an internal gear;
    an at least one planetary gear;
    an at least one bevel gear comprising a plurality of teeth;
    a bevel gear rod;
    the internal gear forming an outer ring of the wheel, wherein said internal gear comprises a plurality of teeth on an innermost circumferential surface;
    the at least one planetary gear comprising a plurality of teeth on the outermost circumferential surface, whereby the plurality of teeth of the at least one planetary gear engage with the plurality of teeth of the internal gear;
    the bevel gear engages with the plurality of teeth of the at least one planetary gear;
    the at least one planetary gear and the at least one bevel gear each having a plane of rotation whereby the plane of rotation of the at least one bevel gear is noncoplanar to the plane of rotation of the at least one at least one planetary gear; and
    the bevel gear rod comprises two ends, a first end and a second end whereby the first end of the bevel gear rod is coupled to the at least one bevel gear at a position concentric with an axis of rotation of the at least one bevel gear.

2. The wheel assembly for a vehicle as claimed in claim 1, further comprising a planetary gear rod, wherein said planetary gear rod comprises two ends, a first end and a second end whereby the first end of the planetary gear rod is coupled to the at least one planetary gear at a position concentric with an axis of rotation of the at least one planetary gear.

3. The wheel assembly for a vehicle as claimed in claim 2, wherein the wheel further comprises a motor whereby the motor is coupled to the second end of the planetary gear rod.

4. The wheel assembly for a vehicle as claimed in claim 3, wherein the wheel comprises a plurality of planetary gears.

5. The wheel assembly for a vehicle as claimed in claim 1, wherein the at least one planetary gear is housed within a planetary gear housing, wherein said planetary gear housing is a substantially concealed cavity that encloses the at least one planetary gear.

6. The wheel assembly for a vehicle as claimed in claim 1, wherein the at least one bevel gear is housed within a bevel gear housing, wherein said bevel gear housing is a substantially concealed cavity that encloses the at least one bevel gear.

7. The wheel assembly for a vehicle as claimed in claim 3, further comprising a wheel housing wherein said wheel housing is a concealed cavity that substantially encloses the motor within said cavity.

8. The wheel assembly for a. vehicle as claimed in claim 1 wherein the wheel further comprises spokes.

9. The wheel assembly for a vehicle as claimed in claim 1 further comprising a tire wherein said tire is coupled to the outermost circumferential surface of the internal gear.

10. The wheel assembly for a vehicle as claimed in claim 1 further comprising a ratcheting mechanism.

11. A wheel assembly for a vehicle comprising a wheel wherein said wheel comprises an internal gear, an at least one planetary gear, and an at least one bevel gear;
    the internal gear forming an outer ring of the wheel, wherein said internal gear comprises a plurality of teeth on an innermost circumferential surface;
    the at least one planetary gear comprising a plurality of teeth on the outermost circumferential surface, whereby the plurality of teeth of the at least one planetary gear engage with the plurality of teeth of the internal gear; and
    bevel gear engages with the plurality of teeth of the at least one planetary gear;
    the at least one planetary gear and the at least one bevel gear each having a plane of rotation whereby the plane of rotation of the at least one bevel gear is noncoplanar to the plane of rotation of the at least one at least one planetary gear.

12. The wheel assembly for a vehicle as claimed in claim 11, further comprising a planetary gear rod, wherein said planetary gear rod comprises two ends, a first end and a second end whereby the first end of the planetary gear rod is coupled to the at least one planetary gear at a position concentric with an axis of rotation of the at least one planetary gear.

13. The wheel assembly for a vehicle as claimed in claim 12 further comprising a bevel gear rod, wherein said bevel gear rod comprises two ends, a first end and a second end whereby the first end of the bevel gear rod is coupled to the at least one bevel gear at a position concentric with an axis of rotation of the at least one bevel gear.

14. The wheel assembly for a vehicle as claimed in claim 13 further comprising a ratcheting mechanism.

15. The wheel assembly for a vehicle as claimed in claim 14, wherein the wheel comprises a plurality of planetary gears.

16. The wheel assembly for a vehicle as claimed in claim 15, wherein the wheel further comprises a motor whereby the motor is coupled to the second end of the planetary gear rod.

17. A wheel assembly for a vehicle comprising a wheel wherein said wheel comprises:
    an internal gear;
    an at least one planetary gear;
    a motor; and
    a ratcheting mechanism;
    an at least one bevel gear comprising a plurality of teeth;
    the internal gear forming an outer ring of the wheel, wherein said internal gear comprises a plurality of teeth on an innermost circumferential surface;
    the at least one planetary gear comprising a plurality of teeth on the outermost circumferential surface, whereby the plurality of teeth of the at least one planetary gear engage with the plurality of teeth of the internal gear;
    the at least one planetary gear being coupled to a planetary gear rod, wherein said planetary gear rod comprises a first end and a second, the at least one planetary gear being coupled to the first end;
    the motor is coupled to the second end of the planetary gear rod;

the bevel gear engages with the plurality of teeth of the at least one planetary gear; and the at least one planetary gear and the at least one bevel gear each having a plane of rotation whereby the plane of rotation of the at least one bevel gear is noncoplanar to the plane of rotation of the at least one at least one planetary gear.

\* \* \* \* \*